United States Patent

Khan

(10) Patent No.: US 6,652,011 B1
(45) Date of Patent: Nov. 25, 2003

(54) BUMPER COVER

(75) Inventor: Shahid R. Khan, Champaign, IL (US)

(73) Assignee: Flex-N-Gate Corporation, Urbana, IL (US)

( * ) Notice: Subject to any disclaimer, the term of this patent is extended or adjusted under 35 U.S.C. 154(b) by 0 days.

(21) Appl. No.: 10/295,318

(22) Filed: Nov. 15, 2002

Related U.S. Application Data

(60) Provisional application No. 60/334,847, filed on Nov. 15, 2001.

(51) Int. Cl.$^7$ .............................................. B60R 19/03
(52) U.S. Cl. ...................................... 293/120; D12/169
(58) Field of Search ................................ 293/120, 115, 293/113, 17, 102, 109, 142, 126, 136; 296/136; 180/68.6; 280/770; 473/2; 248/251; 428/343; D12/169; 228/146; 108/27; 150/166; 15/325

(56) References Cited

U.S. PATENT DOCUMENTS

| | | | | |
|---|---|---|---|---|
| 3,704,887 A | * | 12/1972 | Thorton .......................... 473/2 |
| 4,252,355 A | * | 2/1981 | Goupy et al. ................ 293/120 |
| 4,875,728 A | * | 10/1989 | Copp et al. .................. 293/126 |
| 4,929,008 A | * | 5/1990 | Esfandiary ................... 293/120 |
| 4,997,229 A | * | 3/1991 | Swanson ...................... 296/136 |
| 5,165,643 A | * | 11/1992 | Shreiner ...................... 248/251 |
| 5,487,575 A | * | 1/1996 | Chase ......................... 293/115 |
| 5,585,179 A | * | 12/1996 | Nishiyama .................. 428/343 |
| D382,237 S | * | 8/1997 | Lund et al. ................. D12/167 |
| 5,711,562 A | * | 1/1998 | Terada et al. ............... 293/120 |
| 5,725,933 A | * | 3/1998 | Nishiyama .................. 428/343 |
| 5,799,975 A | * | 9/1998 | Crick .......................... 280/770 |
| 5,934,544 A | * | 8/1999 | Lee et al. .................... 228/146 |
| D419,931 S | * | 2/2000 | Horbury et al. ........... D12/169 |
| D419,932 S | * | 2/2000 | Horbury et al. ........... D12/169 |
| 6,065,786 A | * | 5/2000 | Wheatley .................... 293/109 |
| 6,116,162 A | * | 9/2000 | Santa Cruz et al. .......... 108/27 |
| 6,152,503 A | * | 11/2000 | Jang et al. .................... 293/17 |
| D446,485 S | * | 8/2001 | Shin .......................... D12/169 |
| D447,452 S | * | 9/2001 | Im ............................. D12/169 |
| D447,453 S | * | 9/2001 | Kim .......................... D12/169 |
| D447,454 S | * | 9/2001 | Kim .......................... D12/169 |
| 6,325,121 B1 | * | 12/2001 | Hudnall ...................... 150/166 |
| 6,325,431 B1 | * | 12/2001 | Ito .............................. 293/120 |
| 6,381,802 B2 | * | 5/2002 | Park ............................. 15/325 |

FOREIGN PATENT DOCUMENTS

| | | | |
|---|---|---|---|
| JP | 61-1555 | * | 1/1986 |
| JP | 2000-127872 | * | 5/2000 |
| JP | 2001-19031 | * | 1/2001 |

\* cited by examiner

*Primary Examiner*—Kiran Patel
(74) *Attorney, Agent, or Firm*—Philip L. Bateman

(57) ABSTRACT

A bumper cover is fastened onto an automobile having a polymeric bumper. The bumper cover has a generally navicular concave shell made of thin wall steel having a chrome plated outer surface, the bumper cover having a shape that conforms to the exterior of the polymeric bumper so that it mates with and overlaps the polymeric bumper.

4 Claims, 1 Drawing Sheet

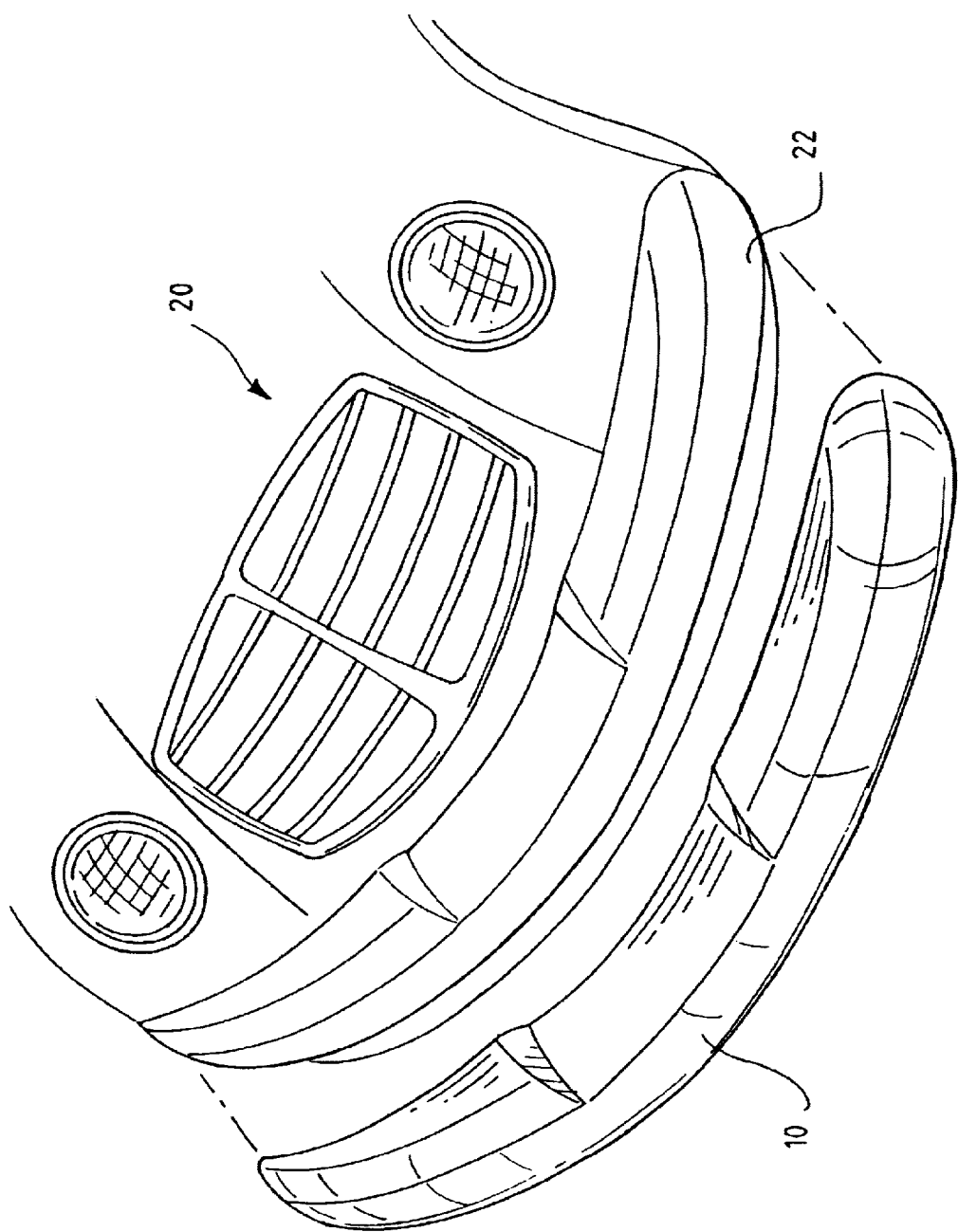

BUMPER COVER

CROSS-REFERENCE TO RELATED APPLICATION

This application claims the benefit of U.S. Provisional Application Serial No. 60/334,847, Nov. 15, 2001.

FIELD OF THE INVENTION

This invention relates to automobiles. More particularly, this invention relates to bumper covers for automobiles.

BACKGROUND OF THE INVENTION

From the 1920's through the 1970's, most new automobiles contained chrome metal bumpers. The term "automobile" is used herein to refer to motor vehicles in general, which includes trucks, sport utility vehicles, and the like. Most modern automobiles now contain bumpers made of polymeric materials. The color of the polymeric bumpers is generally gray, black, or the same as the body.

Chrome metal has been used to fabricate various types of covers for painted parts of automobiles that are prone to wear or chipping. For example, chrome metal covers have been used to cover door handles, door edges, wheel openings, lower fenders, etc. It is clear to the casual observer that these covers are relatively lightweight pieces that protect an underlying part of the automobile.

A number of manufacturers have recently introduced automobiles having a "retro" styling. A notable example of such an automobile is the Chrysler PT Cruiser. Although the PT Cruiser has a retro styling, it still contains polymeric front and rear bumpers. Accordingly, there is a demand for a bumper cover for automobiles such as the PT Cruiser that provides the appearance of a chrome metal bumper.

SUMMARY OF THE INVENTION

One general object of this invention is to provide an improved bumper cover for automobiles having a polymeric bumper. Another general object of this invention is to provide a method of modifying an automobile having a polymeric bumper to give it the appearance of having a chrome metal bumper.

I have invented an improved bumper cover for automobiles having a polymeric bumper. The bumper cover comprises a generally navicular concave shell made of thin wall steel having a chrome plated outer surface. The bumper cover has a shape that conforms to the exterior of the polymeric bumper so that it mates with and overlaps the polymeric bumper.

I have also invented an improved method of modifying an automobile having a polymeric bumper to give it the appearance of having a chrome metal bumper. The method comprises fastening onto the automobile a bumper cover having a generally navicular concave shell made of thin wall steel having a chrome plated outer surface. The bumper cover has a shape that conforms to the exterior of the polymeric bumper so that it mates with and overlaps the polymeric bumper.

The bumper cover of this invention is lightweight, durable, easy to install, and provides additional protection to the polymeric bumper. It also gives the automobile the appearance of having a chrome metal bumper.

BRIEF DESCRIPTION OF THE DRAWING

FIGURE One is a perspective view of a preferred embodiment of the bumper cover of this invention being installed on an automobile with a polymeric bumper.

DETAILED DESCRIPTION OF THE INVENTION

This invention is best understood by reference to the drawing. A preferred embodiment of the bumper cover 10 of the present invention is shown being installed on an automobile 20 having a polymeric front bumper 22. The front bumper protrudes from the front of the automobile so that the bumper makes the initial contact if the automobile collides with an object such as another automobile, a structure, a shopping cart, etc. The bumper cover has a generally navicular concave shape, i.e., it has the shape of a boat hull with an open top and rounded sides. Stated differently, a latitudinal cross section of the bumper cover has the shape of the letter "C." The bumper cover is preferably shaped to mate closely with the automobile bumper so that it tightly and completely overlaps the bumper. When installed, the shape of the front of the automobile is unchanged. The only difference is that the exterior surface of the bumper is metal instead of polymeric. However, if desired, the bumper cover can have a shape which is different than the polymeric bumper which it covers.

The protection given to the automobile by the polymeric bumper is not diminished by the addition of a bumper cover. Accordingly, the bumper cover itself need not contribute to the protection. Furthermore, when the bumper cover mates closely with the bumper, the cover is supported by the underlying bumper. Therefore, the bumper cover may be, and preferably is, a relatively thin, lightweight shell. The preferred bumper cover is made of a coldrolled, aluminum-killed steel of drawing quality having a thickness of about 0.030 inches (0.76 mm). The bumper cover is protected against rust by chrome plating on the exterior surface.

The preferred embodiment of the bumper cover is installed onto the polymeric bumper with tape, adhesive, fasteners (e.g., screws), or the like. When installed, the bumper cover has the appearance of an original equipment chrome bumper. The bumper cover offers protection for the polymeric bumper itself. Polymeric bumpers are easily cut or nicked by sharp objects whereas the bumper cover is highly resistant to such damage. The bumper cover has little effect on the protection of the rest of the automobile.

Although the preferred embodiment of the bumper cover of this invention has a shape and size similar to the polymeric bumper it covers, the bumper cover may, if desired, have a different shape and/or size. The bumper cover of this invention is suitable for use on any type of vehicle having a front or rear bumper.

I claim:

1. A bumper cover for automobiles having a polymeric bumper, the bumper cover comprising a generally navicular concave shell made of thin wall steel having a chrome plated outer surface, the bumper cover having a shape that conforms to the exterior of the polymeric bumper so that it mates with and overlaps the polymeric bumper.

2. The bumper cover of claim 1 wherein the bumper cover is made of a cold-rolled, aluminum-killed steel of drawing quality having a thickness of about 0.030 inches.

3. A method of modifying an automobile having a polymeric bumper to give it the appearance of having a chrome metal bumper, the method comprising fastening onto the automobile a bumper cover having a generally navicular concave shell made of thin wall steel having a chrome plated outer surface, the bumper cover having a shape that conforms to the exterior of the polymeric bumper so that it mates with and overlaps the polymeric bumper.

4. The method of claim 3 wherein the concave shell is fastened onto the automobile with tape, adhesive, or fasteners.

* * * * *